April 8, 1947.  F. W. ORTMAN  2,418,599
APPARATUS FOR MOLDING HELICAL SCREWS
Filed Oct. 2, 1944

INVENTOR.
FRANK WESLEY ORTMAN
BY Hyde and Meyer
ATTORNEYS.

Patented Apr. 8, 1947

2,418,599

UNITED STATES PATENT OFFICE 2,418,599

APPARATUS FOR MOLDING HELICAL SCREWS

Frank Wesley Ortman, Sandusky, Ohio, assignor to Farrell-Cheek Steel Company, Sandusky, Ohio, a corporation of Ohio Application October 2, 1944, Serial No. 556,775

1 Claim. (Cl. 22—14)

This invention relates to improvements in an apparatus for molding helical screws particularly when the screw patterns are of such length as to bend somewhat in the middle during molding and ramming when supported at the ends only.

Long helical screws are used for feeding coal in stokers and in conveyors of the feed-screw type used in many industries. It is desirable in all cases that the screw be as near straight as possible with the outermost elements of the screw flight lying on a true cylinder. Various methods known to me have been proposed for producing this result, but to the best of my knowledge, none of them is suited for the rapid production of uniformly high quality screws such as are made possible by the present invention.

In the drawings,

Fig. 5 is an end view taken from the position of line 5—5 of Fig. 2; while

My invention is described as used in the formation of a helical screw 10 (which represents both the screw formed and the pattern for forming it) of such length and cross-sectional dimensions that it bends in the mid portion of the screw when supported at the ends only. The screw comprises an axially-extending cylindrical shaft portion 10a about which is disposed a helical flight 10b of the type generated by a straight line extending radially outwardly from one side of the shaft portion 10a and travelling spirally along the shaft from one end of the same to the other. It should be understood that the purpose of the present invention is to cast the shaft and flight integrally in one operation and have the same absolutely true and straight from end to end.

Figure 1:
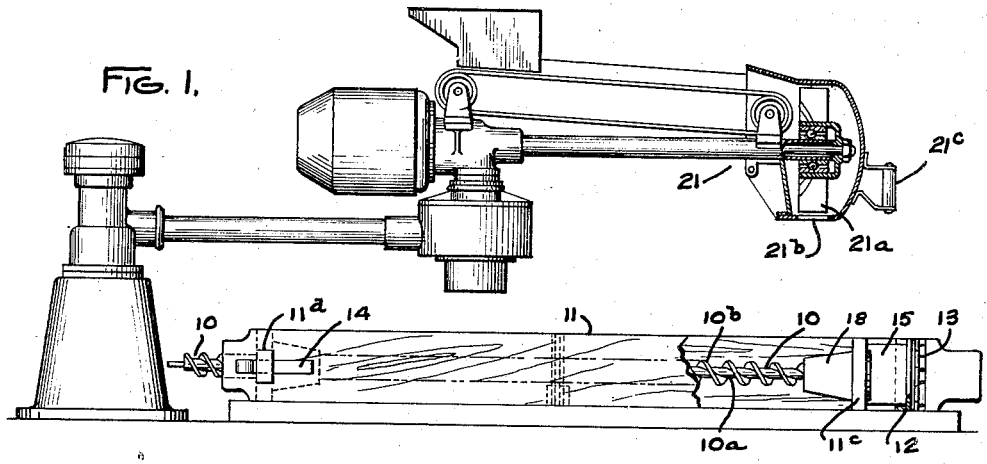
Fig. 1 is an elevational view showing flask and pattern supported in my improved manner with a sand-slinger in position to ram sand into the mold.
Figure 2:
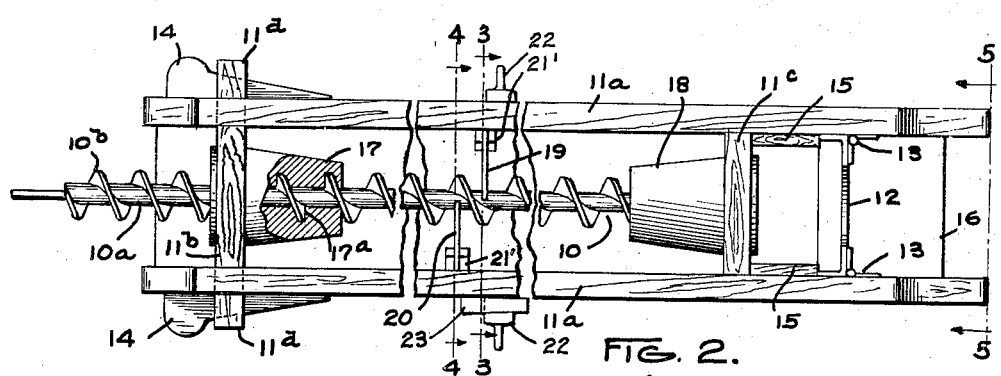
Fig. 2 is an enlarged top plan view of the flask and pattern of Fig. 1.

The flask 11 comprises two parallel side walls 11a, preferably, but not necessarily, connected together at one end by the steel section 12 held in place by the hinges 13. Wooden end walls 11b and 11c are provided. The end wall 11b has end tongues 11d which extend through suitable openings in the side walls 11a, and when the flask is assembled as shown in Figs. 1 and 2, wedges 14 are passed through openings in these tongues so as to hold the side walls 11a firmly against the shoulders of the end wall 11b, and the flask side walls are kept from spreading outwardly by the pressure of the wedges 14 at one end and by the steel section 12 at the opposite end. The end wall 11c is held properly spaced from the steel section 12 for the accommodation of screws of various length by wood spacer blocks 15. It will be noted that the flask is open top and bottom and, when a molding operation is to be performed, the flask is placed upon a suitable surface such as the base channel 16.

The screw pattern 10 is carefully formed in the shape of the screw to be cast. This pattern is supported in the flask by the following means:

At the left end, as viewed in Figs. 1 and 2, a stripper block 17 suitably supported on the end wall 11b is provided with an axially-extending central opening adapted to receive the shaft 10a and a helical slot (seen at 17a) for receiving the flight 10b. At the right-hand end, a core print 18 receives the other end of the screw pattern. Intermediate the ends of the screw and preferably at about its mid point, additional rigid means is supplied for supporting the screw in fixed relation to the flask, but it is held in position chiefly by the sand rammed in the flask and remaining in position during the casting operation.

Figure 3:
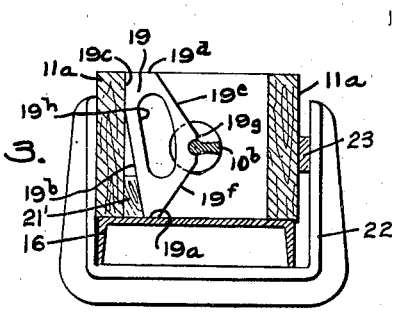
Figs. 3 and 4 are sectional views taken along similarly numbered lines of Fig. 2.
Figure 5:
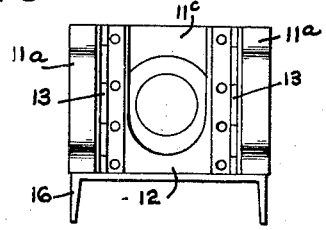
Figure 4:
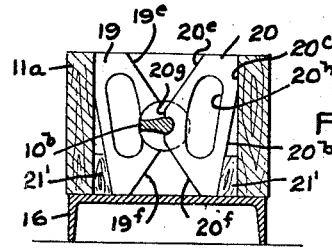

This rigid support means, in the present case, comprises two plates 19 and 20 of cast steel or other rigid material as later disclosed. The plates may be of butterfly-wing shape as best seen in Fig. 4. These plates are alike, and one only will be described, the parts of the other being given similar reference characters. The plate 19 has a flat bottom face 19a of limited extent which rests firmly on the base member 16. The outside edge 19b slopes upwardly and outwardly from the base 19a and rests firmly against a block of wood or the like 21' which fits in the lower corner of the flask at this point. The upper, outer edge of the plate 19c is cut at right angles to the bottom 19a so that it rests firmly against the top portion of the flask side wall 11a. The top of the plate at 19d is level with the top of the flask. The edges of the plate which face inwardly, namely, 19e and 19f, are inclined inwardly to a face 19g of limited extent and lying approximately along the axis of the screw pattern 10. In position to closely embrace the screw shaft 10a, the edge 19g of the plate is provided with a substantially semicircular recess opening inwardly. Before the ramming operation, the plates 19 and 20 are placed as shown in Figs. 2 and 3 approximately at right angles to the axis of the screw pattern and spaced apart longitudinally of the same sufficiently so that, as later described, the screw pattern may be threaded out of the mold, the flight 10b being enabled to pass between the plates 19 and 20. In Fig. 3, I have shown plate 19 positioned at a point where the flight 10b extends horizontally toward the right, as viewed in Fig. 3, away from the recess in the edge 19g, while in Fig. 4, I have shown the plate 20 positioned at a point where the flight 10b of the screw pattern extends horizontally toward the left away from the recess in the plate edge 20g. However, it will be understood that any position of the plates 19 and 20 on opposite sides of the screw pattern fairly close together near the longitudinal center of the pattern is satisfactory so long as the screw flight may pass between the plates upon rotation of the pattern.

A C clamp 22 of known type is placed under the plate 16 with its parallel sides extending upward and against each side of flask 11a. A wooden wedge 23 is then inserted between one side of the flask and one side of the C clamp. This wedge is driven in with a hammer which tightens the supports 19 and 20 and also prevents the flask 11a from spreading when the sand is rammed in the flask. The clamp is shown in Figs. 2 and 3 but omitted in other views for clearness.

With the parts in the position shown, the molding sand is rammed in the flask 11a. This operation may be accomplished by hand but I prefer to use the sand-slinger 21 shown in elevation in Fig. 1. This sand-slinger is of the type shown in Patent No. 2,212,510, granted August 27, 1940, to Murray G. Clay and Elmer O. Beardsley, although it will be understood by those skilled in this art that any similar device may be used. In operation, this sand-slinger throws a stream of sand at high velocity from the impeller 21a through the opening 21b substantially vertically downward. The head of the device is manipulated by means of the handle 21c. I prefer to use a powerful sand-slinger of this type because a stream of sand directed downwardly in the flask on either side of the screw pattern causes the sand to flow inwardly and upwardly beneath the pattern so as to fill all voids around the screw and particularly beneath it. To aid in the flow of sand around the pattern near the plates 19 and 20, I preferably provide large openings through the mid portion of these plates as indicated at 19h and 20h. Also, the diverging edges 19e and 20e above the pattern and 19f and 20f below the pattern leave plenty of room for the flow of sand on opposite sides of the plates 19 and 20.

When the flask is completely filled, the sand is struck off level across the upper edges of the flask. Suitable sprues or gates are provided at the opposite ends of the mold communicating with the prints 17 and 18, and the screw pattern is then rotated to remove it from the mold. This action takes place without any disturbance of the molding sand throughout the long length of the screw because in the first place, the screw pattern 10 is made absolutely straight, and, in the second place, it is so rigidly supported by the stripper block 17 and the plates 19 and 20 (which are now firmly held in the molding sand) that even an unskilled workman can remove the pattern successfully. The blocks 17 and 18 are now removed and replaced by suitable core prints. Molten metal is then poured through the sprues or gates which have been provided, and, when the metal has hardened sufficiently, the casting is stripped from the flask. The plates 19 and 20 do not fuse with the metal of the casting and fall away freely.

Figure 6:
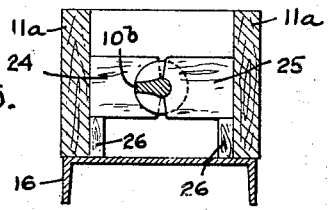
Fig. 6 is a view similar to Fig. 4 showing a modified form of brace.

I may substitute for the steel plates 19 and 20, other hard, rigid material forming a pair of braces of similar character for supporting the long screw pattern against bending in the middle during ramming. In Fig. 6, I show such substitute braces 24 and 25 made of core sand properly formulated, molded and dried and having sufficient strength and rigidity to replace the steel supports previously described. The cores 24 and 25 are rectangular in shape extending from the sides of the flask 11a to the exact center to the shaft of the screw pattern, being placed like plates 19 and 20, thus holding the pattern in exactly the same manner and for the same purpose as the steel plates 19 and 20. The cores are held in place by blocks 26 which support the outer ends while the pattern shaft holds the inner ends.

I have thus provided a method and apparatus for casting elongated screws quickly and accurately with ordinary foundry help. This process produces this type of screw more rapidly and with fewer rejections than any other process known to me for the production of the same article.

What I claim is:

Apparatus for integrally casting a long screw having a cylindrical shaft about which is disposed a helical flight extending radially away from said shaft, comprising an elongated flask, a screw pattern of the screw to be cast, two upright braces supported in said flask from opposite sides thereof and intermediate the ends of the flask, said braces extending above said shaft, there being recesses in said braces opening laterally inwardly and adapted to half embrace said shaft of said screw pattern respectively on opposite sides thereof, and said braces being spaced apart longitudinally of said screw pattern sufficiently to permit the flight thereof to pass between said braces after sand is rammed in said flask about said pattern and said pattern is screwed out of the sand by rotation about its axis.

FRANK WESLEY ORTMAN.

REFERENCES CITED

The following references are of record in the file of this patent:

UNITED STATES PATENTS

| Number | Name | Date |
|---|---|---|
| 1,779,763 | Carter | Oct. 28, 1930 |
| 511,393 | Wrigley | Dec. 26, 1893 |

FOREIGN PATENTS

| Number | Country | Date |
|---|---|---|
| 7,691 | British | 1895 |